United States Patent [19]

Whitney et al.

[11] 4,222,741

[45] Sep. 16, 1980

[54] METHOD OF PROCESSING MECHANICALLY REMOVED PORCINE SKINS FOR ULTIMATE GELATIN OR LEATHER PRODUCTION

[75] Inventors: Edward A. Whitney, Raymore, Mo.; Gerald M. Weiss, Lancaster, Wis.

[73] Assignee: Dubuque Packing Company, Dubuque, Iowa

[21] Appl. No.: 19,123

[22] Filed: Mar. 9, 1979

Related U.S. Application Data

[63] Continuation-in-part of Ser. No. 808,698, Jun. 21, 1977, abandoned.

[51] Int. Cl.$^2$ .......................... C14C 1/06; C14C 1/08
[52] U.S. Cl. .................................. 8/94.16; 8/94.1 R; 8/94.15
[58] Field of Search ................ 8/94.16, 94.15, 94.1 R, 8/94.11

[56] References Cited

U.S. PATENT DOCUMENTS

| | | | |
|---|---|---|---|
| 1,976,881 | 10/1934 | Harvey | 8/94.16 |
| 2,016,260 | 10/1935 | Turley | 8/94.16 |
| 2,101,877 | 12/1937 | Sheppard et al. | 8/94.16 |
| 2,155,087 | 4/1939 | Grassman et al. | 8/94.16 |
| 3,625,811 | 12/1971 | Okamura | 8/94.16 |
| 3,799,737 | 3/1973 | Elvrum | 8/94.16 |

OTHER PUBLICATIONS

Extraction of Glue & Gelatin from Skins and Hides, Abstract JALCA, 59, p. 88 (1964).

*Primary Examiner*—John Kight, III
*Attorney, Agent, or Firm*—Clarence A. O'Brien; Harvey B. Jacobson

[57] ABSTRACT

A process for treatment of mechanically removed porcine skins for the production of edible gelatin or of both gelatin and leather, the present invention provides a step-wise method for chemical dehairing and degreasing of the skin, which method offers an environmentally more acceptable procedure for dehairing, degreasing, and ultimately treating the skin to produce gelatin and leather, the quality of the ultimate products being uncommonly high. The dehaired and degreased skin can then be processed for conventional gelatin production or said skin can be mechanically split into a grain layer for leather or gelatin production and a flesh layer for conventional gelatin or leather production.

6 Claims, No Drawings

METHOD OF PROCESSING MECHANICALLY REMOVED PORCINE SKINS FOR ULTIMATE GELATIN OR LEATHER PRODUCTION

CROSS-REFERENCE TO RELATED APPLICATION

This application is a continuation-in-part of our co-pending patent application Ser. No. 808,698, filed June 21, 1977, now abandoned.

BACKGROUND OF THE INVENTION

Field of the Invention

The invention relates to treatment of animal skins for processing into useful products. More particularly, the invention relates to chemical dehairing and degreasing of a mechanically removed porcine skin for the production of high quality gelatin or high quality leather. Under the conditions as taught by the present invention of less harsh chemical treatments of skins than are conventionally employed, a substantial environmental advantage, as well as a substantial economic cost advantage, is obtained.

Disclosure Statement

In U.S. Pat. No. 3,799,737, issued Mar. 26, 1973, to Elvrum, curing and pretanning of a bovine hide is disclosed by chemical treatment with chemical agents which, when applied to porcine hide treatment, cause digestion of hair to proceed to the point that an effluent sludge is obtained which poses a considerable environmental disposal problem. Moreover, chemical treatment agents containing a high total sulphur level are required in the Elvrum method, and it is well-known that under current environmental control restrictions, such restrictions becoming increasingly stringent and severe in recent years, the economic cost of sulphur removal in effluent produced by the Elvrum process is substantial, and for a high volume operation, can become prohibitive. Moreover, the Elvrum process requires strong alkali treatment with the first solution, which solution serves to attack extraneous surface contaminants, but which may require neutralization with relatively expensive acid, and which presents a disposal problem whether neutralized or not. The high sulphur content of effluent remaining from use of the Elvrum process poses a potentially severe air pollution problem as well, in that odors of hydrogen sulfide, sulphur dioxide, or the like, are highly objectionable and current permissible limits are quite low, while the difficulty of removing sulphur from effluent resulting from the Elvrum or related process is considerable. Similar problems of waste disposal of sulphur containing effluent result from use of related processes, such as that disclosed by Grassman et al in U.S. Pat. No. 2,155,087, issued Apr. 18, 1939, wherein a treatment is disclosed with a sulfhydrate solution used in a concentration of 1 to 2% and a sulfide solution in a concentration of 0.5 to 1%.

In U.S. Pat. No. 3,625,811, issued to Okamura on Dec. 7, 1971, a method of preparing fibers from animal pelts is disclosed, no porcine hides being specifically contemplated, and no method for producing high quality gelatin or leather being apparent in Okamura.

Each of the three prior art patents discussed above discloses methods and processes which require heating for long periods of time to temperatures substantially above the ambient surroundings, Elvrum calling for treatment preferably at from 90° F. to 95° F. (32.2° C. to 35° C.) for 15 to 90 minutes, with treatment in another step with an aqueous solution at 90° F. to 100° F. (32.2° C. to 37.8° C.) for 20 minutes. Such treatments represent a considerable investment of energy and economic cost in furnishing steam lines for heating of solutions, burners, or other energy sources. Other prior processes require long periods of soaking or treatment, such as the processes disclosed by Okamura which require treatment for 20 to 60 minutes at a temperature of about 30° to 35° C. (86° F. to 95° F.). In view of energy shortages and rapidly increasing energy costs, prior processes which require heating of liquids to temperatures above the ambient for extended periods of time are disfavored, and are likely to become even less acceptable in the future with respect to processes which are more energy efficient.

It is the finding disclosed in the present application that the quality and yield of gelatin or leather obtainable from treatment of porcine skins is increased substantially when treatment parameters are closely controlled in the manner taught by the present invention. Without such controls, low quality gelatin is the usual result, the quality of gelatin commonly being measured in terms of its Bloom strength. A high Bloom strength gelatin represents a higher grade or quality of gelatin. Only gelatins of the highest Bloom strength are suitable for certain uses, such as for the manufacture of pharmaceutical capsules. Higher Bloom strength gelatins have a considerably higher market value, inasmuch as demand is greatest for gelatin of a quality which offers the potential for use in applications which demand high quality or high Bloom strength gelatin. In general, Bloom strength is measured in increments of 25 to 50 units, with a Bloom strength of 250 or over representing good gelation, while a Bloom strength of 300 or greater represents the best gelation. Further, it is a property of gelatin that irreversible solubilization can occur at sufficiently high temperatures for a sufficient period of time, leading to a decrease in Bloom strength. The present invention represents an improvement upon prior art processes in demonstrating recognition of the need for process control to prevent irreversible solubilization in order to maintain high Bloom strength of gelatin ultimately produced.

A further variable of importance to consideration of the quality of gelatin is its viscosity, a reduction of viscosity being another consequence of irreversible solubilization. Accordingly, higher viscosities in general represent higher quality of gelatin product.

Yet another important consideration in gelatin quality is the presence and concentration of chemical contaminants, such as sulphur materials from processing agents, heavy metal ions, and potentially harmful microorganisms, such as bacteria of the genera Staphylococcus, Pseudomonas, and Salmonella.

A conventional treatment process for porcine skins requires a period of approximately 5 hours, relatively high temperatures being required to be maintained for substantial portions of such time. Traditional porcine skin processing into leather, as well as conventional gelatin manufacture, has not markedly advanced for some 40 to 50 years. Conventionally, a gelatin manufacturer extracts with application of heat under atmospheric conditions, filters liquors, evaporates and dries products in a manner improved upon very little over such period of time. A porcine skin is typically removed from wholesale pork cuts following a 24-hour chilling period. The skin surface is denatured, the dehydrated skins containing approximately 17 to 24% of fat. The skins are coarse ground, washed and acidulated at pH 2.0 for about 12 to 20 hours. The resultant liquor is then adjusted to approximately pH 4.0 and gelatin is extracted by four 3-hour cooking procedures at temperatures of about 120° F. (48.9° C.), 140° F. (60° C.), 170° C. (76.7° C.) and 212° F. (100° C.), respectively. The individual extractions are deionized, evaporated and dried. The gelatin is then ground to the desired particle size and evaluated for physical, chemical and bacteriological characteristics which determine the particular batches which meet particular customer specifications for food or pharmaceutical applications.

The mechanical removal of porcine skins during slaughter operations in the meat packing industry is conventionally available with specialized machinery being used to separate the skin from the carcass. The skin so removed includes external hair on the upper surfaces and fatty tissues on the lower surfaces thereof. According to prior practices available in the art, a porcine skin is used to produce either gelatin or leather. The presently disclosed method allows treatment of a single skin in a step-wise manner such that the treated skin can be mechanically split into two portions, each of the portions being useful in the production of leather or gelatin.

SUMMARY OF THE INVENTION

The present invention improves processing of porcine skins which are mechanically removed from the carcasses of animals during normal slaughterhouse operations, particularly swine skins. Generally, the present process subjects the hair and fat-bearing skin to a chemically less caustic treatment which renders the upper fraction, or outer grain layer, of the skin suitable for further processing into a high-grade leather, the lower fraction exclusive of fat and fleshy layers being useful for further processing into gelatin or leather. The skin so processed according to the present invention is mechanically split into the aforesaid upper and lower fractions for further treatment according to conventional methods for respective production of leather and gelatin. If desired, the entire skin can be used after treatment according to the present invention in the production of gelatin or leather. The dehairing and degreasing process contemplated by the present invention essentially allows a more dilute chemical solution to be used in the processing of the skin into a high quality leather component and a high quality protein component.

The steps of the present invention generally involve preliminary removal of environmental debris typically associated with the live animal and which may be adhered to the mechanically removed skin. Subcutaneous fatty tissues are then mechanically removed from the flesh side of the skin. The skins so preliminarily treated are degreased in a mechanically agitated aqueous solution of light soda ash and then dehaired in a mechanically agitated aqueous solution of hydrated lime, light soda ash, solium sulfhydrate, and dimethylamine sulfate. The skins are then washed with water relimed with an aqueous solution of hydrated lime, and then rewashed with water. The skins can then be mechanically split into an upper grain layer and a lower high collagen layer for respective production of leather and edible gelatin, the two layers being delimed in a sequential washing process wherein an aqueous solution primarily consisting of ammonium sulfate and sulfuric acid is used, the concentration of sulfuric acid being varied during the deliming procedure. A substance known commercially as Oropon Z, a product of the Rohm and Haas Company, and which is chemically known as the proteolytic enzyme, trypsin, is also used in the deliming solution. The washed delimed fractions of the skin are in a physical state suitable for production of leather or gelatin as aforesaid.

While animal skins other than porcine skins can be treated according to the invention, the treatment of such skins by the method of the invention does not provide all of the advantages of the invention which occur as a result of the processing of swine skins. In particular, swine skins produce a higher quality gelatin than does any other animal skin.

Accordingly, it is a primary object of the invention to provide a process for treating a mechanically removed porcine skin, so that the skin can be mechanically split into fractions respectively useful in the production of both leather and edible gelatin products.

A further object of the invention is to provide a process for degreasing and dehairing a pig skin which has been mechanically removed from a carcass.

Another object of the invention is to provide a process for treating a swine skin so that the skin can either be used in the conventional production of edible and/or high quality gelatin or alternatively used in the production of high quality leather.

Still another object of the invention is to provide a process for treatment of porcine skin which produces a high Bloom strength, high viscosity gelatin usable for applications requiring a high quality gelatin.

Yet another object of the invention is to provide a process which requires reduced expenditures of energy and reduced treatment times than certain conventional porcine skin processing operations.

Still a further object is to provide a process which is more sanitary and efficient than conventional processes.

Yet a further object is to provide a process which gives a gelatin essentially free of harmful microorganisms, having acceptably low levels of heavy metal concentrations, and having a sulphur content which meets U.S. Food and Drug Administration specifications for edible gelatin.

Another further object is to provide a process which furnishes a high quality leather produced from porcine skins.

Another important object is to provide a process which includes a pre-acidulation steps, thereby reducing the time of acidulation in subsequent processing into final gelatin or leather products.

These together with other objects and advantages which will become subsequently apparent reside in the details of construction and operation as more fully hereinafter described and claimed.

DESCRIPTION OF THE PREFERRED EMBODIMENTS

Conventional practices in the slaughter of hogs traditionally involved dehairing of the virtually intact carcass and subsequent removal of the dehaired skin from individual wholesale cuts of pork. More recently, mechanical removal of hog skins from carcasses prior to dehairing has provided a more sanitary and energy efficient procedure. In all of these prior art procedures, the hog skin is further processed to produce either edible gelatin or leather. The present invention particularly provides for dehairing and degreasing of mechanically removed hog skins, the hog skins then being suitable for conventional gelatin or leather production, or for further processing with separate fractional portions, one of which portions being primarily useful for the production of gelatin and the other of the portions being useful for the production of pig skin leather.

The raw material used in the present process is a hog skin which has been mechanically removed from a carcass. The skin has hair and environmental debris indigenous to the live animal on the outer surfaces thereof as well as subcutaneous adipose tissue and proteinacious material adhering to the skin on the inner surfaces thereof. Extraneous subcutaneous adipose tissues and thin layers of proteinaceous material are removed from the inner surfaces or flesh side of the skin through use of a well-known fleshing machine set at a level to remove the excessive adipose and muscle tissue which may be adhering to the epidermis layer of the skin. The epidermis layer is thus exposed in a state free of subcutaneous fatty tissue and muscle fragments.

The following step-wise process employed according to the invention is intended to treat the skin is intended to be generally illustrative of the invention, temporal treatment intervals and material concentrations being variable without departing from the scope and intent of the invention. Fleshed skins are introduced into an aqueous degreasing solution nominally made up of 75% water and 1.0% light soda ash by weight of the fleshed skins. Light soda ash is a commercially available mixture of sodium carbonate and sodium hydroxide. The solution is maintained at a temperature of 85°±1° F. (29.4° C.±0.56° C.), the skins being maintained with continuous mechanical agitation in this solution for approximately 10 minutes. This degreasing solution, along with liberated triglyceride material and environmental debris (if not previously removed), is then drained from the now degreased skins.

The degreased skins are then subjected to a bristle burning solution which comprises 75% water, 3.0% hydrated lime, 4.0% light soda ash, and 0.66% flake sodium sulfhydrate by weight of the fleshed skins. Dimethylamine sulfate is also added to the solution at a concentration of 1.5% by weight of the fleshed skins, the quantity of dimethylamine sulfate to be introduced into the solution being diluted in a 1:1 ratio with water prior to addition thereof into the solution. The bristle burning solution is maintained at a temperature of 85°±1° F. (29.4° C.±0.56° C.), the skins being continuously agitated by known mechanical means for approximately 35 minutes. The bristle burning solution is then drained from the skins, liberated bristle particles being thereby removed therefrom.

The degreased and dehaired skins are then washed with mechanical agitation for 10 minutes with water at a temperature of 85°±1° F. (29.4° C.±0.56° C.). A reliming solution, consisting of 75% water and 1% hydrated lime by weight of the fleshed skins, is then used to relime the skins. The skins are subjected to continuous mechanical agitation in the reliming solution for 10 minutes at a temperature of 85°±1° F. (29.4° C.±0.56° C.). After complete drainage of the reliming solution from the skins, the skins are washed with 85° F. (29.4° C.) water for 30 minutes, the skins being mechanically agitated during this washing process.

The skins can now be mechanically "split" into fractions, the fractions comprising an upper grain layer and a lower high collagen layer. The grain layer is useful for production of leather while the high collagen layer is useful for the manufacture of gelatin. The entire skin can alternatively be processed to produce either gelatin or leather. Both the grain layer and the high collagen layer are subjected to deliming in a manner to be described hereinafter in preparation for further processing into leather and/or gelatin.

The entire skin or the separated layer fractions are delimed in an aqueous solution comprising 75% water, 20% ammonium sulfate and 0.2% Oropon Z by weight of the fleshed skins. Oropon Z is a product of the Rohm and Haas Company and chemically comprises the proteolytic enzyme, trypsin. A quantity of 96.5% reagent grade sulfuric acid of specific gravity 1.84, equal to 1.25% by weight of the fleshed skins is diluted five fold with water and is introduced into the deliming solution in four incremental amounts and at four spaced temporal intervals. Other initial concentrations of sulfuric acid may be used as long as the final diluted concentration is within a few percent of the diluted acid solution above described. Other acids, such as hydrochloric acid, or the like, can also be used, the concentrations of such acids being determined in light of the concentration of sulfuric acid indicated above and in light of appropriate ionic corrections. The separated fractions are mechanically agitated in the initial deliming solution for 10 minutes, the temperature of the solution being maintained throughout the deliming process at 85°±1° F. (29.4° C.±0.56° C.). After this 10 minute period, the first of the four incremental amounts of the aqueous sulfuric acid solution is introduced into the deliming solution, the separated skin fractions being mechanically agitated therein for an additional 10 minutes. Subsequent second, third, and fourth incremental amounts of the aqueous sulfuric acid solution are then added at 10 minute intervals, the skin fractions being mechanically agitated throughout the deliming process. Following the addition of the fourth incremental amount of the aqueous sulfuric acid solution, the deliming solution and the skin fractions are mechanically agitated for one hour. Variance in pH should ecncompass a range of between 1.2 to 6.0 for either leather or gelatin production.

Acid remaining in the skins following deliming according to the method disclosed herein serves to pre-acidulate the skins in preparation for further processing, thereby reducing the time otherwise required for acidulation in production of leather or gelatin.

The deliming solution is then drained from the skin fractions, the fractions being then washed with water for five minutes. The water is preferably maintained at 65°-70° F. (18.3°-21.1° C.), the skin fractions being mechanically agitated in the water during the washing process. The grain layer fractions are in a physical state suitable for conventional "pickling" or other processing such as is normally practiced in the manufacture of pig skin leather. The high collagen layer fractions, or "splits", are in a physical state suitable for further processing into gelatin in a conventional manner. Thus, the present invention provides a process wherein the same skin can be used in the manufacture of leather or of gelatin alone.

Examples I and II demonstrate the substantial savings in time which result from use of the method of the present invention compared with a conventional tannery porcine skin chemical dehairing procedure from the first step through the deliming step. As can be seen from Example I, the conventional tannery dehairing operation, a total time of about 5 hours is required, while for Example II, it is apparent that the procedure of the present invention cuts the time required substantially, to a total of about 1 hour and 20 minutes. This represents a substantial reduction in labor costs, as well as the cost of energy required to maintain the various chemical solutions at the necessary temperature. In addition, the time savings effected by the procedure of the present invention permits a larger volume of porcine skins to be treated in a given period of time, thereby increasing the efficiency and productivity of equipement needed. It is also apparent that substantially less total sulphur is required in the procedure of Example II than that of Example I, leading to environmental advantages in disposal of effluent. Furthermore, the hair with a total solids content, as well as total sulphur concentration, that poses substantial disposal problems, as those skilled in the art can readily appreciate.

EXAMPLE II.

The following procedure was developed employing lowered acid concentrations, as well as lower solution temperatures than are present in many prior procedures for chemical dehairing. The over-all result is a method found to successfully dehair pig skins in a time of about 1 hour and 20 minutes, a very significant improvement from the approximately 5 hour process of Table 1, which is representative of processes conventionally employed in tannery dehairing operations.

TABLE 2

Process of Example II

| % By Weight of Raw Material | Ingredient | Operation | Time | Temp. |
|---|---|---|---|---|
| 50% | Water | Wash loose debris | 5 min. | 85° F. (29.4° C.) |
| 3% | Lime | | | |
| 6% | Soda Ash | Chemically | | |
| 1% | Sulfhydrate | burning hair | 20 min. | 85° F. (29.4° C.) |
| 1% | DAMAS* | | | |
| 4% | Ammonium Sulfate | Neutralize product | 5 min. | 85° F. (29.4° C.) |
| ½% | Sulfuric acid | Acidity product | 30 min. | 85° F. (29.4° C.) |
| 2% | Lime | Wash out residual chemicals | 20 min. | 85° F. (29.4° C.) |

*Dimethylamine Sulfate.

removed by the procedure of Example II has sufficient fiber integrity to permit filtration or removal by standard techniques, while the hair mass accumulation of Example I is in a partially digested state in the form of a sludge of partly solubilized hair, which is not easily filterable with conventional equipment, as is the case with the filamentous hair of Example II. Accordingly, when an attempt is made to dispose of the sludge of Example I, a frequent result is plugging of drains, an increased burden on pollution control facilities, or of sewage treatment facilities, if the sludge is ultimately discharged into sewer lines which reach a municipal or industrial sewage treatment plant.

EXAMPLE I

A conventional chemical pig skin dehairing procedure, which is very similar to procedures used in conventional tannery dehairing operations is shown in Table 1.

EXAMPLE III

An evaluation of the process of the present invention was undertaken in terms of the quality of gelatin ultimately produced, as well as the quality of the leather obtained from the split portion of pig skin formed in the method of Example V.

For Examples III to VI, pig skins were obtained from Hidebound Industries, Macomb, Illinois, a pig skin processing establishment which received its total supply of fleshed pig skins from Oscar Mayer and Company, Beardstown, Illinois. The pig skins possessed very little fat following fleshing and were very uniform in size.

In Example III, the fleshed pig skins were dehaired by an improvised technique utilizing a stainless steel drum with galvanized tank heart washer at Dubuque Packing Company, Dubuque, Iowa. The sample was acidulated for 14 hours at a pH of 1.5, and was then washed back to a pH of 4.0. The sample was adequately

TABLE 1

Process of Example I

| % By Weight of Raw Material | Ingredient | Operation | Time | Temp. |
|---|---|---|---|---|
| 200% | Water | Wash out excess salt | 5 min. | 85° F. (29.4° C.) |
| 1% | Soda Ash | Remove grease from hair | 15 min. | 85° F. (29.4° C.) |
| 4% | Lime | | | |
| 3% | Soda Ash | Chemically burn hair | 1¼ hr. | 85° F. (29.4° C.) |
| 1% | Sodium Sulfhydrate | | | |
| 1% | Dimethylamine Sulfate | | | |
| 1% | Soda Ash | Chemically burn hair | 2¼ hr. | 85° F. (29.4° C.) |
| ½% | Sodium Sulfhydrate | | | |
| ½% | Dimethylamine Sulfhydrate | | | |
| 1% | Lime | Relime | 10 min. | 60° F. (15.6° C.) |
| 200% | Water | Wash out chemicals | 10 min. | 60° F. (15.6° C.) |
| 1½% | Sulfuric Acid | Deliming | 20 min. | 85° F. (29.4° C.) |

It will be noted that the solutions for the chemical treatment of hair must be maintained for periods of several hours at a temperature of about 85° F. (29.4° C.), necessitating considerable energy and labor input. A five hour period is needed utilizing chemical agents swollen. The procedure next used was essentially that followed by Example II, the resultant product being further processed into gelatin in the following manner. The sample was cooked for 3 hours at 150° F. (65.6° C.), at which time the liquors were drawn off and placed under 9° C. refrigeration for 15 hours. A second and final cook at 212° F. (100° C.) for 3 hours provided the final liquor and was refrigerated in the same manner. The gelled slabs were ultimately placed in an air circulating incubator at 37°–40° C. for 15 hours. Following drying, the sample was retained at WARF Institute, Madison, Wisconsin, for metal and microbiological assey, while the properties of Bloom, viscosity, pH and percent moisture were determined at Keystone Gelatin Subsidary, Dubuque, Iowa, on the gelatin sample. The results of gelatin sample testing for heavy metal concentrations are shown in Table 3. Some pharmaceutical requirements allow a maximum of 50 ppm of iron, lead, copper, and zinc. The excess beyond 50 ppm can easily be removed by deionization techniques currently in operation. Microbiological data for the gelatin samples appear in Table 4, the influence of acidulation as taught by the present invention being believed to definitely contribute to the negative counts for the four specific bacteria tested. The total aerobic microbial count is low for Example, 3, indicating a high quality gelatin product. The Bloom strength and viscosity measurements shown in Table 5 were adjusted to 11.5% moisture using the following conversion factors, determined empirically to be appropriate for adjusting to uniform moisture content. For the Bloom strength, 5 grams of gelatin were added or subtracted for every 1% difference above or below 11.5% moisture, respectively. For viscosity, determinations were made on a 6⅜% solution, with 2% being added or subtracted for every 1% difference in moisture above or below 11.5%, respectively.

EXAMPLE IV

Pig skins from the same source as Example III are dehaired in a glass lined, wooden tannery drum at Berlin Tannery, Berlin, Wisconsin, in order to determine by comparison with Example III any possible metal contamination of subsequently extracted gelatin. The sample was acidulated and washed in the same manner as Example III, and the skin was found to be adequately swollen. The skin was dehaired substantially as in Example II. The sample was then treated for gelatin production in the same manner as Example III, and the tests for metal and microbiological assay, Bloom strength, viscosity, pH, and percent moisture were conducted in the same manner as Example II, the results being shown in Tables 3, 4 and 5. It can be seen from Table 3 that, while certain metal concentrations, particularly, iron, are lower than in other Examples, the sulphur content is somewhat higher. However, all contaminant concentrations are within acceptable limits, inasmuch as metal concentrations in excess of 50 ppm can be easily removed by standard deionization techniques currently conventionally used.

EXAMPLE V

Skins from the same source as Example III were arranged to be split into an upper and lower layer at Berlin Tannery, Berlin, Wisconsin. The upper low collagen layer was to be used for garment leather, with the lower high collagen layer to be used for gelatin production. The upper skin layers of "split", were left at Berlin, Wisconsin, to be processed into garment leather. As a comparison, a full intact skin was left at the tannery to be processed into shoe leather. It was found that the "split" portion of the pig skin resulted in a very full grain, beautiful garment leather of high quality. In treatment, the skin was acidulated and washed in the same manner as Example III, and the skin was found to be adequately swollen. The skin was dehaired substantially as in Example II, acidified, pumped and split into the upper grain layer for leather and the lower high collagen layer for gelatin. Tests for metal and microbiological assay, as well as Bloom strength, viscosity, pH and percent moisture were determined in the same manner as the foregoing Examples for the collagen rich lower layer, the results of which are presented in Tables 3, 4 and 5. Results of the tests indicate that, as for Examples III and IV, metal levels are sufficiently low to either meet pharmaceutical requirements of 50 ppm or low enough to be easily removed by conventional deionization techniques. Negative counts for the four specific bacteria tested are encouraging, as well as the low total aerobic microbial count. As with Examples II and III, desirable gelatin quality is obtained, although the split skin gelatin fraction of Example V is seen to have the highest adjusted Bloom strength, as well as adjusted viscosity, and therefore is seen to be the superior material. Examples IV and V, the Berlin dehaired skin and split skin fractions, absorbed acid very rapidly upon acidulation and cooked expediently. Such reaction results in a shorter processing time and possibly improved gelatin quality.

EXAMPLE VI

Flesh pig skins from the same source as Example III were left with the hair on, not being subjected to any chemical dehairing process. This sample was acidulated and washed in the same manner as Example III; however, the hair-on sample of Example VI did not uniformly or adequately absorb acid, resulting in lower yields and lower quality gelatin ultimately obtained from this raw material source. The sample was processed into gelatin in the same manner as Example III, and the tests for metal and microbiological assay, Bloom strength, viscosity, pH, and percent moisture were determined in the same manner as for Example III. A high total aerobic microbial count was obtained for the sample of Example VI. Since hair is a high vector of bacteria by nature, such result is expectable. Although the gelatin quality ultimately obtained is acceptable, the hair-on gelatin fraction of Example VI displays the poorest quality material of the four samples tested in Examples III to VI.

TABLE 3

| METAL CONCENTRATIONS OF GELATIN SAMPLES | | | | | | |
|---|---|---|---|---|---|---|
| Sample Identification | Iron ppm | Lead ppm | Copper ppm | Zinc ppm | Sulphur % | Example No. |
| Dubuque Dehaired Skins | 67.6 | 0.35 | 0.82 | 30.0 | 1.5 | III |
| Berlin Dehaired Skins | 41.8 | 1.16 | 1.26 | 13.6 | 2.15 | IV |
| Split Skins | 59.7 | 0.55 | 1.27 | 9.36 | 1.68 | V |
| Hair-On Skins | 44.9 | 1.94 | 1.68 | 27.8 | 2.33 | VI |

TABLE 4

MICROBIOLOGICAL RESULTS OF GELATIN SAMPLES

| Sample Indentification | Example No. | Total Aerobic Microbial Count/100 g. | Staphylococcus aureus | Pseudomonas aeruginosa | Escherichia coli | Salmonella |
|---|---|---|---|---|---|---|
| Dubuque Dehaired Skins | III | 760 | Negative | Negative | Negative | Negative |
| Berlin Dehaired Skins | IV | 420 | Negative | Negative | Negative | Negative |
| Split Skins | V | 870 | Negative | Negative | Negative | Negative |
| Hair-on Skins | VI | 2,600 | Negative | Negative | Negative | Negative |

TABLE 5

QUALITATIVE PARAMETERS OF GELATIN SAMPLES

| Sample Indentification | Bloom | Adj. Bloom | Viscosity | Adj. Viscosity | pH | % Moisture | Example No. |
|---|---|---|---|---|---|---|---|
| Dubuque Dehaired Skins | 256 | 268 | 48.6 | 51.0 | 4.7 | 14.05 | III |
| Berlin Dehaired Skins | 267 | 268 | 56.5 | 56.6 | 4.65 | 11.71 | IV |
| Split Skins | 262 | 273 | 55.7 | 57.9 | 4.55 | 13.66 | V |
| Hair-on Skins | 265 | 256 | 38.6 | 39.0 | 4.6 | 9.63 | VI |

The results of testing of the process of the present invention on pig skins from various sources, processed under the varying conditions outlined above, indicates the advantages of the present invention in terms of lower acid concentrations, lower temperatures, higher collagen protein obtainable in the ultimate gelatin product, reduced environmental pollution problems, and high quality leather obtainable with the split skin fractions obtainable by the present invention. Potential pollutants, such as sulphur and acid, can be effectively handled so as not to constitute an expensive or insurmountable environmental problem. Savings of energy and labor, as well as time and increases in production capacity, are obtainable. Uses of gelatin manufactured from porcine skins, not previously obtainable with conventional techniques for porcine skin processing, are available with use of the present invention, inasmuch as gelatin of sufficiently high Bloom strength and viscosity can be obtained for such uses, such a pharmaceutical capsule manufacture. In addition, the physical, chemical and bacteriological characteristics of gelatin obtained are acceptable or superior to those obtainable by conventional processes.

Any "piggy" odor generated in the production process of the present invention can easily be eliminated by use of charcoal. Furthermore, as indicated above, pieces of hair and debris resulting from the dehairing operations of the present invention are easily removed during filtration of the liquors.

The concentrations of the solutions used in the examples of the present invention are based for convenience on the initial weight of the fleshed skins. It is to be understood that other standards could be employed at various stages of the process, particularly since the weight of the treated skins varies during the process, to make up desired solution concentrations as long as a proportional relationship to the disclosed concentrations based on the initial weight of the fleshed skins is maintained.

EXAMPLE VII

As an illustration of the environmental effects of the process of Example I, compared with Example II, tests of chemical hair removal effluent were conducted on a sample of the reaction effluent to determine possible effects if the effluent were discharged directly to the sewer. Test effluent from the process of Example I was diluted to 1% by volume and a protein precipitant ferric sulfate solution was added, causing considerable blackening and inhibition of coagulation and flocculation reactions which are necessary in subsequent effluent processing steps. Dilution to 0.5% by volume eliminated problems with the coagulation and flocculation reactions, but still caused slight darkening of the effluent. Neutralization of the effluent with sulfuric acid permitted further processing with dilution only to 5% by volume, but led to evolution of hydrogen sulfide and necessity to prevent escape of such pollutant to avoid air pollution problems. Moreover, separation of the sludge is necessary when so neutralized with acid.

With the process of the present invention, neither neutralization nor problems of coagulation and flocculation inhibition result, inasmuch as filtration of the filamentous mass of hair avoids all problems in effluent treatment associated with further processing of the hair sludge.

The foregoing description of a preferred manner of practicing the invention is not to be taken as limiting of the present process to the exact temperatures, temporal processing intervals, and concentration of chemical substances in the processing solutions of the examples of the invention set forth above. Given the teachings presented herein, it is believed obvious that one of ordinary skill in the art could vary the exact thermal, temporal, and concentration parameters of the present process to produce the desired improvements in the articles of manufacture envisioned by the invention and described herein, except those described as necessary to be held within a critical range, and subject to limits outlined for certain process parameters. Therefore, the invention is understood to be limited only by the recitations of the appended claims.

What is claimed as new is as follows:

1. In a process for treating porcine skins which have been removed from the carcasses of porcine animals, the improvement comprising dehairing said skins in an over-all time of approximately 80 minutes by the following steps:
    (a) removing subcutaneous adipose and proteinaceous tissue from the skins for about 5 minutes with water constituting about 50% of the weight of skins at a temperature of about 85° F. (29.4° C.);
(b) chemically burning the skins from step (a) for about 20 minutes with a solution at 85° F.±1° F. (29.4° C.±0.56° C.), the burning solution comprising about 3% lime, 6% soda ash, 1% sodium sulfhydrate, and 1% dimethylamine sulfate in aqueous solution, all measured by weight of skins;
(c) neutralizing the product from step (b) with the neutralizing solution containing about 4% ammonium sulfate by weight of skins in water at 85° F.±1° F. (29.4° C.±0.56° C.) for about 5 minutes;
(d) acidifying the product of step (c) with sulfuric acid solution containing about ½% sulfuric acid by weight of skins in water at 85° F.±1° F. (29.4° C.±0.56° C.) for about 30 minutes; and
(e) washing out residual chemicals from the treated skins produced in step (d) for about 20 minutes with a washing solution of lime in water at a temperature of 85° F.±1° F. (29.4° C.±0.56° C.).

2. The process of claim 1 wherein the sulfuric acid solution in step (d) is divided into four equal increments and each increment is added at successive temporal intervals.

3. The process of claim 1 wherein the washed skins from step (e) are mechanically split to give an inner high collagen fraction to produce gelatin having a Bloom strength adjusted for 11.5% moisture of at least about 265, and a viscosity adjusted for 11.5% moisture of at least about 50.

4. The process of claim 1 wherein the neutralizing solution in step (c) additionally contains trypsin.

5. The process of claim 2 wherein the temporal intervals are about ten minutes each and wherein the process further comprises mechanically agitating the skin fractions during subjection thereof to the successively formed solutions.

6. The process of claim 3 wherein said gelatin additionally has a sulfur content of no greater than about 2.2% by weight, and has a total aerobic microbial count of less than about 1,000 per 100 grams.

* * * * *